US011062327B2

(12) United States Patent
Biswas et al.

(10) Patent No.: US 11,062,327 B2
(45) Date of Patent: Jul. 13, 2021

(54) REGULATORY COMPLIANCE ASSESSMENT AND BUSINESS RISK PREDICTION SYSTEM

(71) Applicant: Xybion Corporation Inc., Lawrenceville, NJ (US)

(72) Inventors: Kamal Biswas, Monroe Township, NJ (US); Pradip K. Banerjee, Princeton, NJ (US); Robert J. Friedman, Pompton Plains, NJ (US); Avanish Ojha, Morrisville, PA (US); Anuradha Roy, Marietta, GA (US)

(73) Assignee: Xybion Corporation Inc., Lawrenceville, NJ (US)

( * ) Notice: Subject to any disclaimer, the term of this patent is extended or adjusted under 35 U.S.C. 154(b) by 64 days.

(21) Appl. No.: 16/286,285

(22) Filed: Feb. 26, 2019

(65) Prior Publication Data
US 2020/0273046 A1    Aug. 27, 2020

(51) Int. Cl.
| | | |
|---|---|---|
| *G06Q 10/00* | (2012.01) | |
| *G06Q 30/00* | (2012.01) | |
| *G06N 3/08* | (2006.01) | |
| *G06Q 10/06* | (2012.01) | |

(52) U.S. Cl.
CPC ............ *G06Q 30/018* (2013.01); *G06N 3/08* (2013.01); *G06Q 10/0635* (2013.01)

(58) Field of Classification Search
CPC .................................................. G06Q 50/26
USPC ...................................................... 705/7.28
See application file for complete search history.

(56) References Cited

U.S. PATENT DOCUMENTS

| | | | | |
|---|---|---|---|---|
| 8,005,693 B2* | 8/2011 | Bonissone | ............. | G06Q 40/08 705/4 |
| 8,793,146 B2* | 7/2014 | Bonissone | ............. | G06Q 40/08 705/4 |
| 9,224,180 B2* | 12/2015 | Macoviak | ............. | G16H 40/63 |
| 10,254,760 B1* | 4/2019 | Abeloe | ................ | G06N 3/0454 |
| 2007/0087756 A1* | 4/2007 | Hoffberg | ................ | G06Q 20/40 455/450 |

(Continued)

OTHER PUBLICATIONS

Thao, Linh & Maggi, Fabrizio & Montali, Marco & Rinderle-Ma, Stefanie & Aalst, Wil. (2015). Compliance monitoring in business processes: Functionalities, application, and tool-support. Information Systems. 14. 10.1016/j.is.2015.02.007. (Year: 2015).*

*Primary Examiner* — Joseph M Waesco
*Assistant Examiner* — Jay-Ming Wang
(74) *Attorney, Agent, or Firm* — Lowenstein Sandler LLP

(57) ABSTRACT

An electronic platform to measure a maturity or level of an entity in view of regulatory and business risks relating to regulatory compliance. The methods and systems can collect various data (e.g., regulatory agency reports, regulatory agency warning letters (e.g. FDA warning letters), internal and vendor company audit results, fines and settlement information, country business risks, regulatory agency product recalls, etc.) from various different data sources. The collected information is analyzed using machine learning techniques to determine a risk compliance level or score for one or more of an entity's companies, functions, control types, and locations arising from regulatory audit non-conformances. The risk compliance scores can be used to generate a risk prediction and identify one or more actions to be taken by the entity to improve or increase an associated compliance level.

12 Claims, 7 Drawing Sheets

(56) References Cited

U.S. PATENT DOCUMENTS

| | | | |
|---|---|---|---|
| 2009/0299896 A1* | 12/2009 | Zhang | G06Q 40/025 |
| | | | 705/38 |
| 2014/0188541 A1* | 7/2014 | Goldsmith | H04L 67/306 |
| | | | 705/7.19 |
| 2017/0019496 A1* | 1/2017 | Orbach | G06Q 30/00 |
| 2018/0285362 A1* | 10/2018 | McCoy | G06Q 10/10 |
| 2019/0171438 A1* | 6/2019 | Franchitti | G06F 16/9538 |
| 2019/0180140 A1* | 6/2019 | Sasson | G06Q 50/08 |
| 2019/0340013 A1* | 11/2019 | Cella | G06F 16/27 |

\* cited by examiner

FIG. 6

Unique Number: ALO-104  
Name: General Audit for Regulation ABC  
Audit Type: Regulatory Audits  
Audit Sub Type: XYZ  
Entity: DEF  
Location/Facility: 123

Audit⌄   Details⌄   Report⌄

Predictive Compliance Sample Report

| *Function Type/Control Type* | Process | People | Quality | Technology | Governance | Investigation | Improvement | Third Party |
|---|---|---|---|---|---|---|---|---|
| Quality Assurance | 0.27 Low | 0.95 Very High | 0.95 Very High | 0.81 Very High | 0.95 Very High | 0.31 Low | 0.79 High | 0.63 High |
| Document Control | 0.18 Very Low | 0.70 High | 0.70 High | 0.13 Very Low | | 0.18 Very Low | 0.33 Low | 0.95 Very High |
| Facility | 0.51 Medium | 0.51 Medium | 0.57 Medium | 0.51 Medium | 0.95 Very High | | 0.95 Very High | |
| Materials | 0.43 Medium | 0.95 Very High | 0.33 Very Low | 0.95 Very High | | | 0.83 Very High | | though about by individual companies generally or specific to their industry.

REGULATORY COMPLIANCE ASSESSMENT AND BUSINESS RISK PREDICTION SYSTEM

TECHNICAL FIELD

The present disclosure generally relates to techniques for assess a level of maturity of an entity with respect to regulatory compliance and, more particularly, to systems and methods for determining a compliance level of a company based on an aggregated collection of public information and entity-specific information.

BACKGROUND

Conventionally, entities in certain industries (e.g., pharmaceutical companies) are required to achieve and maintain compliance status in view of applicable regulatory rules and standards. To do so, an entity may execute internal assessments or hire external consultants to perform audits in an effort to better understand the entity's current compliance status. However, entities lack immediate visibility into emerging regulatory changes, which inhibits the entity's ability to ensure compliance with regulatory requirements. In addition, manual intervention in a conventional regulatory compliance review process is time consuming, sporadic, inefficient, error prone and expensive. The entities audit programs are periodic by design and lacks to understand the compliance maturity levels real-time between audits. Accordingly, entities do not have the capabilities, bandwidth and systems to predict business risks associated with existing non-conformances associated with regulatory compliance standards.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

FIG. 6 illustrates an example report including risk compliance index scores generated by a regulatory compliance assessment system, in accordance with one or more embodiments of the present disclosure.

Figure 1:
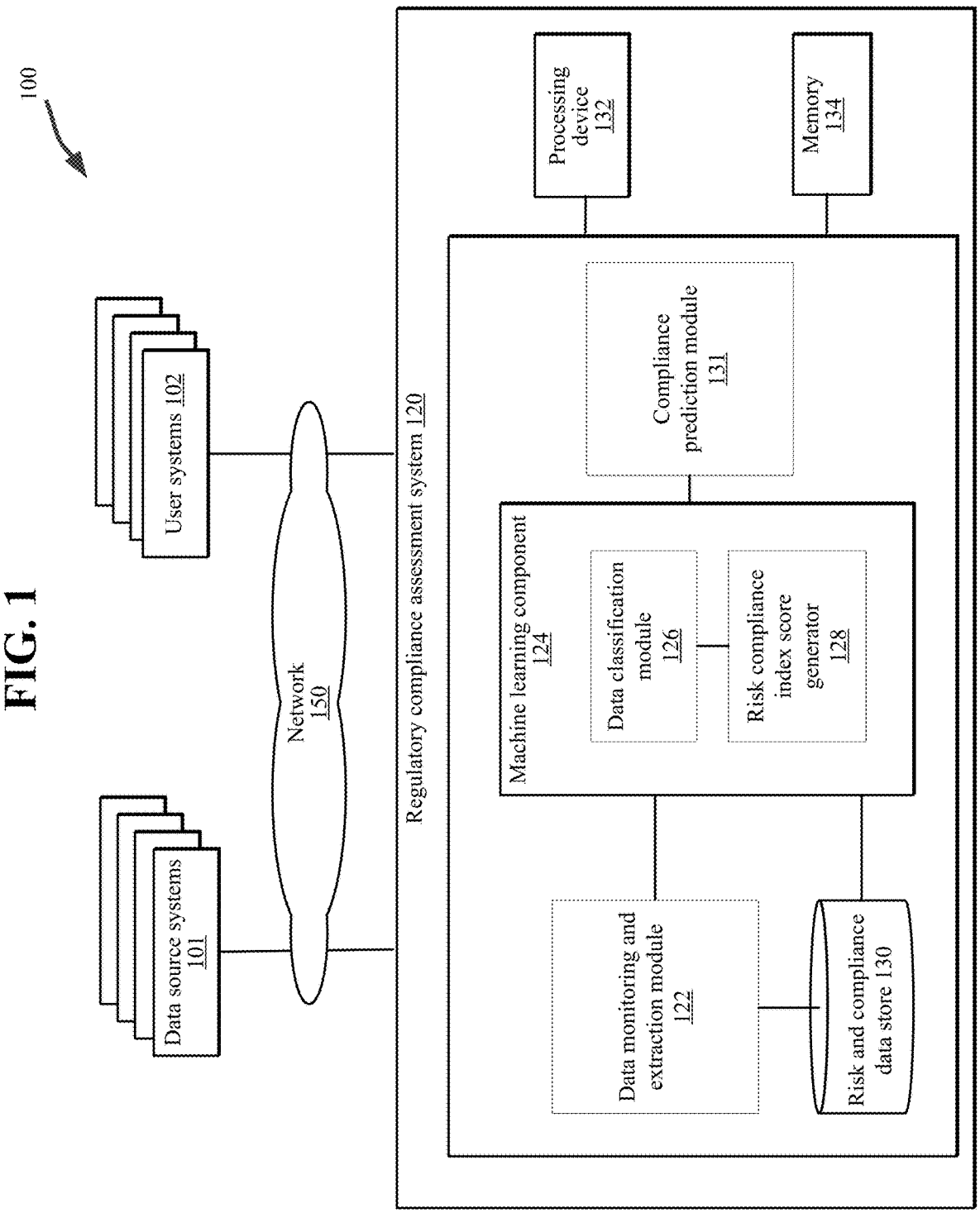
FIG. 1 illustrates an example regulatory compliance assessment system in an example computing environment, in accordance with one or more embodiments of the present disclosure.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Embodiments described herein relate to a regulatory compliance assessment system to generate a profile including an index or score representing an entity's risk compliance level or maturity. In one embodiment, a system (herein referred to as a "regulatory compliance assessment system") can be employed in an electronic environment including one or more regulatory-related data sources (herein "data source systems") and one or more systems associated with an entity (also referred to as a "user system"). In an embodiment, the regulatory compliance assessment system is configured to execute one or more methods to determine a risk profile corresponding to an entity. In an embodiment, the risk profile can include a compliance maturity level or score associated with the entity associated with a user system that is based on analysis of data aggregated from the multiple data source systems.

Conventionally, user systems are unable to define and measure a maturity level corresponding to regulatory compliance applicable to an industry. As such, each entity is unaware of their current compliance related business risks other than knowing the compliance related issues and reported non-conformances. Due to this unawareness, the entity can attempt to fix any and all outstanding compliance factors or issues, without priority or adequate knowledge of the risk that each factor represents. In this regard, entities are constrained by their available bandwidth and budgets and, as a result, struggle to remain in or on a path to a compliant status. In addition, as a result of conventional manual analysis of compliance and time intensive audits, the compliance status of the entity is difficult to determine and reflects only a point in time compliance status when what is needed is a compliance maturity that can be maintained consistently over long periods of time on a near real time basis.

Aspects of the present disclosure address the above and other deficiencies by collecting and analyzing regulatory-related data and generate a risk compliance index score representing a risk compliance maturity associated with an entity (herein referred to as a "maturity level"). Advantageously, a maturity level of an entity in an industry subject to regulatory compliance factors and risks (e.g., a pharmaceutical company) can be tracked, monitored, iteratively determined, updated, and stored over a period of time in a consistent and actionable manner, according to embodiments of the present disclosure. In an embodiment, the maturity level determined in accordance with the present disclosure can be associated with one or more actions to be performed by the entity to improve the entity's compliance position (e.g., the identification of incomplete compliance tasks). Accordingly, the systems and methods of the present disclosure produce improvements over conventional systems in the analysis, classification, aggregation, and management of compliance related data and the generation of predictions relating to the compliance of an entity with one or more applicable regulations across multiple control types and function types associated with the entity.

In an embodiment, the regulatory compliance assessment system collects and analyzes data from multiple data source systems in generating the risk compliance index score representing the maturity level of an entity. For example, the collected data can include regulatory agency reports (e.g., Food and Drug Administration (FDA) Form 483s), regulatory agency warning letters (e.g., FDA warning letters), internal and external audit results associated with an entity, fines and settlement information (e.g., as provided by the U.S. Department of Justice), country business risk data (e.g., data provided by organizations such as Organization for Economic Co-operation and Development), and regulatory agency product recalls. The collected data is stored and maintained in a data store (e.g., one or more databases) for processing, indexing, examining and analyzing by the regulatory compliance assessment system. In an embodiment, the collected data is processed according to one or more methods described herein to determine one or more risks associated with an entity, a function of the entity, or a location of the entity corresponding to regulatory audit non-conformances. The regulatory compliance assessment system monitors the multiple data source systems, extracts the regulatory-related data, and employs machine learning methodologies (e.g., heuristic pattern matching and multi-dimensional neural network processing) to classify the regulatory-related data for use in generating the risk compliance index score. In an embodiment, the regulatory compliance assessment system is configured to execute simulations associated with the risk compliance index score by modifying one or more data points contributing to the risk compliance index score to identify or predict one or more actions that can be taken by the entity to improve the risk compliance index score. The risk compliance score of entities in a specific industry segment (e.g. pharmaceutical industry) can be compared and presented at the industry level risk compliance score.

In an embodiment, the regulatory compliance assessment system conducts assessment of an entity and its functions the current level of compliance maturity (RCMM) using pre-defined questionnaires. In an embodiment, the RCMM level becomes the compliance maturity benchmark for an entity or any function within the entity that is used for risk compliance index calculation.

FIG. 1 illustrates an electronic environment 100 including a regulatory compliance assessment system 120 operatively coupled to one or more data source systems 101 and one or more user systems 102. In an embodiment, the data source systems 101 include one or more computing devices operable by respective data providers to provide regulatory-related data to the regulatory compliance assessment system 120. In an embodiment, the data source systems 101 can include one or more systems providing FDA data (e.g., FDA 483 data), a risk compliance maturity model (RCMM) data, internal audit data, an external audit data, historical country risk data, entity assessment data (e.g., fines and settlements data).

In an embodiment, the user systems 102 can include one or more computing devices operable by an entity to access the regulatory compliance assessment system 120 to enable the generation of a risk compliance index score associated with the entity in accordance with the methods described in detail herein. According to embodiments, the data source systems 101 and the user systems 102 can include a processor-based system such as a computing system. Such a computing system may be embodied in the form of a desktop computer, a laptop computer, personal digital assistants, cellular telephones, smartphones, set-top boxes, music players, web pads, tablet computer systems, game consoles, electronic book readers, or other devices with like capability. The data source systems 101 and the user systems 102 can include further components such as, for example, user input devices such as a keyboard and mouse and/or various other types of input devices such as pen-inputs, joysticks, buttons, touch screens, etc., and a display. The display can be configured to render one or more graphical user interfaces (GUIs) generated by the regulatory compliance assessment system 120. The display can include, for example, one or more devices such as liquid crystal displays (LCD), gas plasma-based flat panel displays, organic light emitting diode (OLED) displays, electrophoretic ink (E ink) displays, LCD projectors, or other types of display devices, etc.

The content source systems 101 and the user systems 102 can be operatively coupled to the regulatory compliance assessment system 120 via a network 150 using a suitable connection interface (e.g., a web-enabled browser, an application programming interface (API), etc.). In one embodiment, the network 150 may be any suitable network, including, for example, the Internet, intranets, extranets, wide area networks (WANs), local area networks (LANs), wired networks, wireless networks, etc., or any combination of two or more such networks. In some implementations, users can install an application and/or select a service in order to access the regulatory compliance assessment system 120. In an embodiment, the application can be downloaded and installed on one or more of the user systems 102. For example, the users may select to download the application associated with the regulatory compliance assessment system 120 from a service associated with an online server. In an embodiment, the user system 102 can transmit a request for the application over a network and in response, receive the application from the service. The application may be installed locally on a device (e.g., a mobile device) of the user systems 102. Alternatively, the application can be stored at the service remotely and may be accessed through a connected computing device, for example, via a web browser. In an embodiment, the system can be used offline without network connectivity and synced to the online system when internet connectivity is established.

In some implementations, the regulatory compliance assessment system 120 includes one or more computing devices configured to provide an automated platform for the monitoring, collecting, and aggregating of regulatory-related data and the execution of methodologies to analyze the data to generate a risk compliance index score associated with an entity operating a user system 102.

Each entity or user of the regulatory compliance assessment system 120 may be associated with a user account which may govern access permissions and set configurations for the user. For example, the user account can enable access by the regulatory compliance assessment system 120 to one or more data stores of the user system 102 including regulatory-related data associated with the entity (e.g., internal audits, historical audit data, entity function data, entity control types data, entity findings data, etc.)

In one embodiment, the regulatory compliance assessment system 120 can include a data monitoring and extraction module 122, a machine learning component 124 including a data classification module 126 and a risk compliance index score generator 128, and a risk and compliance data store 130 configured to perform the operations and functions described in detail herein with regard to FIGS. 1-7. The regulatory compliance assessment system 120 can include one or more processing devices 132 to implement and/or execute components (e.g., the data monitoring and extraction module 122, the machine learning component 124, the data classification module 126, and the risk compliance index score generator 128) of the regulatory compliance assessment system 120 and a memory 134 to store data associated with the operations and functions of the regulatory compliance assessment system 120. In an embodiment, the components of the regulatory compliance assessment system 120 can include hardware, software, or a combination thereof configured to perform the tasks, operations, functions, programs, processes, etc. described in detail herein. It is noted that although various components are described herein, the regulatory compliance assessment system 120 can include any number of components configured to implement the processes and functionality described in detail with regard to FIGS. 1-6.

In an embodiment, the data monitoring component 122 can receive, retrieve, collect, or download raw regulatory-related data associated with an entity from one or more data source systems and/or one or more user systems 102. The regulatory-related data can include company assessment data (e.g., internal audits, external audits, data associated with questionnaires), historical data (e.g., audit failures, fines and settlements, contractual obligations, etc.), FDA data (e.g., FDA 483 classifications), etc. In an embodiment, the regulatory-related data can be collected on a periodic and iterative basis (e.g., once a day, every day) to capture changes in the data and enable an updated calculation of the associated risk compliance index score, as described in greater detail below. In an embodiment, the data monitoring and extraction module 122 generates a data file (e.g., a JSON data payload) including the collected regulatory-related data. In an embodiment, the data monitoring and extraction module 122 monitors the one or more data source systems 101 for updates to the raw regulatory-related data and extracts one or more data elements (e.g., a word, phrase, a symbol, etc.) from the raw data for further processing by the regulatory compliance assessment system 120. In an embodiment, the data monitoring and extraction module 122 a BLDS can include one or more adapters configured to interface with and read the data source systems 101 (including any new data sources), classify the raw data, and map the data to the data processing methods described in detail below.

In an embodiment, the data monitoring and extraction module 122 collects Risk and Compliance Maturity Model (RCMM) data associated with an entity which represents an entity's risk and compliance maturity based upon a company survey across entity function areas (examples of which are provided below) and control types (examples of which are provided below).

In an embodiment, the data monitoring and extraction module 122 collects raw regulator-related data from one or more data sources that are independent of a specific entity (e.g., company) or specific audit and are generally available in the public domain (also referred to as Base Line Data Sources (BLDS)). Examples BLDSs include FDA warning letters, court-imposed fines and settlements on industry companies. In an embodiment, the data monitoring and extraction module 122 can collect or ingest the regulator-related data from the one or more BLDSs using suitable network data gathering enhanced techniques, such as, for example web-based crawling techniques. In an embodiment, the data monitoring and extraction module 122 collects raw regulator-related data from one or more data sources that provide internal company audits and internally reported non-compliance issues, also referred to as a point of time data source (PTDS). In an embodiment, the collected and extracted regulatory-related data can be stored in a risk and compliance data store 130.

In an embodiment, the data classification module 126 of the machine learning component 124 is configured to analyze the extracted data elements of the collected regulatory-related data to classify the data based on function types, control types, and findings levels. In an embodiment, a three-dimensional classification of a data object (e.g., a document or file including regulatory-related data) is generated by the machine learning component 124, wherein the three-dimensional classification includes the function type, control type, and findings level determined for the data object (e.g., a document).

The function type represents one or more functions of the entity associated with the data. Example function types include: corporate (e.g., an administrative function which oversees other departments across potentially multiple locations and countries), quality assurance, production (e.g., a function responsible for producing drugs, chemicals, components or devices that the entity manufactures and/or sells), research and development (a function responsible for developing and improving products (e.g., drugs, chemicals, components devices, etc.)), quality control (QC) (e.g., a function responsible for testing the output of production), engineering (e.g., a function responsible for the physical structures and tools used by the company), marketing (e.g., a function responsible for advertising and communication with the public, including customers), sales (e.g., a function responsible for selling the products of the entity, working most directly with the customers to conclude sales), environmental health and safety (EHS) (e.g., a function responsible for the health and safety of workers and visitors), supply chain management (e.g., a function responsible for working with suppliers or vendors of goods or services consumed by the entity), legal (e.g., a function responsible for legal agreements, contracting documents and for preventing and addressing legal issues), financial (e.g., a function responsible for accounting and financing), ethics (e.g., a function responsible for ensuring ethical standards are created, disseminated and followed), regulatory management (e.g., a function responsible for submitting reports and requests to regulatory agencies and addressing issues with these entities such as the FDA, environmental protection agency (EPA)), privacy (e.g., a function responsible for following regulations on staff and customer personal information privacy), risk management (e.g., a function responsible to address and reduce risks (legal, financial, quality) from other departments), information technologies (IT) (e.g., a function responsible for computer hardware and software used by the entity), vendor management (e.g., a function responsible to manage suppliers of contractors, tools, supplies, etc.)

As noted above, the data classification module 126 of the machine learning component 124 is configured to analyze the extracted data elements of the collected regulatory-related data to classify the data based on a control type. Example control types include a process control type (e.g., written procedures to ensure steps are reproducible), a quality control type (e.g., testing of the deliverables and results to determine if the results are within expected tolerances, a human resources control type (e.g., staff and contractor hiring, training, competency), a technology control type (e.g., laboratory equipment, software, computer hardware, infrastructure (buildings, plumbing, electricity, Internet access, heating and cooling)), a governance control type (e.g., management structure, chain of command, ethics guidelines, reporting to regulatory agencies), an investigation control type (e.g., internal audits, tracking of non-conformance to process, corrective actions, quality assurance), an improvement control type (e.g., corrective actions, feedback to improve process, deliverables and results), a documentation control type (e.g., documented evidence of some action), a training control type (e.g., training of employees), stability studies (e.g. studies conducted to prove product stability), cleaning control type (e.g., evidence of maintaining cleanliness), validation (e.g. evidence of validating a process of system to produce reproducible results), complaints (e.g., all internal or external complaints), lab control (e.g. controls used in a lab operation), change management (e.g., a method and evidence to ensure changes are well informed and documented), calibration (e.g., to ensure instruments are calibrated to perform as desired), sample management (e.g., manage all laboratory and production samples), label management (e.g., all labels are accounted for), batch information (e.g., all production batch records), testing (e.g., all products and raw material testing information), and a third party control type (e.g., external vendor auditing, quality control and processes with third party partners and vendors).

As noted above, the data classification module 126 of the machine learning component 124 is configured to analyze the extracted data elements of the collected regulatory-related data to classify the data based on a findings level. Example findings levels include a "not available" level indicating that corresponding compliance-related steps or procedures are not available; a "not written" level indicating corresponding compliance-related steps or procedures are not written in a document, a "partial" level indicating corresponding compliance-related steps or procedures are written in a document, but are incomplete, a "not followed" level indicating corresponding compliance-related steps or procedures are written but are not being followed, and a "no evidence" level indicating there is a claim the corresponding compliance-related steps or procedures are being followed but no written evidence that the steps were followed.

In an embodiment, the data classification module 126 can analyze RCMM data associated with an entity to determine an input or factor for determining an overall risk compliance index score for an entity. In an embodiment, one or more functions associated with an entity can be evaluated by applying pre-defined questions having expected responses of "Yes", "No", or "Partial." In an embodiment, the questions are phrased such that a positive response (Yes) means that the risk is reduced (e.g., yes, process X is performed by the entity). In an embodiment, each of the questions is linked or associated with an RCMM level. In an embodiment, the RCMM level is represented by an integer, wherein a higher score indicates a higher maturity level. For example, the RCMM levels can be as follows: Level 0: Ad-hoc; Level 1: Defined; Level 2: Managed; Level 3: Measured; and Level 4: Optimized.

An example questionnaire including example questions relating to RCMM levels can include an identification of the entity (e.g., an entity name), a location of the entity, a function (e.g., QA), a control type (e.g., process), a series of questions (e.g., "Do you have standard methods or works on ad-hoc ways?", "Do you have defined processes, but executed in silo?", "Are processes defined and executed in most places?", "Are processes defined, institutionalized and measured?", "Are processes optimized through data analysis?"), an RCMM level corresponding to each question (e.g., Level 0-Level 4), and a status associated with each question (e.g., Yes/No/Partial)

In an embodiment, the data classification module 126 calculates the RCMM level for each control type and function by taking a highest level for which a positive answer (e.g., Yes or Partial) is given. In an embodiment, an RCMM level is assigned in view of a highest level for which a positive status was identified. In an embodiment, the RCMM level or score is used as a weight for each function type and control type (e.g., function type: QA; control type: Process). For example, the weights can be determined as assigned according to the following:

if (RCMM level=0) {assign a weight of 0.95};
    if (RCMM level=1) {assign a weight of 0.6};
    if (RCMM level=2) {assign a weight of 0.4};
    if (RCMM level=3) {assign a weight of 0.2}; and
    if (RCMM level=4) {assign a weight of 0.1}.

In an embodiment, the data classification module 126 can analyze and classify data from one or more BLDSs (e.g., FDA 483 data sources, historical country risk data sources, fines and settlements data sources, etc.). In an embodiment, the data classification module 126 classifies one or more data objects (e.g., documents) or records including FDA 483 data into a control type, a function type, and a findings level. In an embodiment, the data classification module 126 can provide the FDA 483 data including the classifications to the risk compliance index score generator 128 as a frequency count of a total number of FDA 483s by year for each control type, function type, and findings level. In an embodiment, the frequency count of a total number of FDA 483s by year for each control type, function type, and findings level as one of the of the inputs for use by the risk compliance index score generator 128 in determining the risk compliance index score of the entity.

In an embodiment, the data classification module 126 classifies one or more data objects or records including historical country data into a control type, a function type, and a findings level. In an embodiment, the historical country data includes a list of countries, and, for each country, a risk score corresponding to one or more factors including a corruption perception, an organization culture, historical issues or fines, performance expectations, and social expectations. In an embodiment, the risk scores for one or more of the factors are combined into an overall country risk score percentage (e.g., 0% to 100%), wherein a higher percentage represents a higher risk level. In an embodiment, the overall country risk score percentage for each country associated with a site or location of a given entity is provided as an input to the risk compliance index score generator 128 for use in calculating the risk compliance index score of the entity.

In an embodiment, the data classification module 126 classifies one or more data objects or records including fines and settlements data into a control type, a function type, and a findings level. The fines and settlements data can be provided as an input to the risk compliance index score generator 128 including a year, a penalty description (e.g., a monetary value in dollars), the control type, and the function type. In an embodiment, the fines and settlements data records can be combined for each control type and corporate function presented and converted into a ratio of overall yearly fines (e.g., producing results from 0 to 1, wherein where 1 represents a high fine area).

In an embodiment, the data classification module 126 can analyze and classify data from one or more PTDSs (e.g., internal and external audit data). In an embodiment, the data classification module 126 analyzes internal and external audit results including individual procedural Non-Conformance (NC) findings that are accumulated over time. For example, the data classification module 125 analyzes a question asked, a corresponding RCMM level, and a corresponding Yes/No/Partial response for one or more of the following: for a unit of the entity being evaluated, for each audit selected to be part of the risk compliance index score calculation, for each control type and company function categorization available. In an embodiment, the questions can be configured or phrased such that a positive response (Yes) means that the risk is reduced (e.g., yes, process X is performed at the entity). In an embodiment, a findings level associated with audit data (herein an "audit level") can be as follows: Level 0: Ad-hoc; Level 1: Defined; Level 2: Managed; Level 3: Measured; and Level 4: Optimized.

In an embodiment, the audit level can be determined for each control type and function by taking the highest level for which a positive answer (Yes or Partial) is given. In an embodiment, the resultant audit level is converted into a ratio (from 0 to 1, where 1 represents the highest risk level), according to the following example scale:

if (audit level=0) {return 0.95};
if (audit level=0.5) {return 0.8};
if (audit level=1) {return 0.6};
if (audit level=1.5) {return 0.5};
if (audit level=2) {return 0.4};
if (audit level=2.5) {return 0.3};
if (audit level=3) {return 0.2};
if (audit level=3.5) {return 0.15};
if (audit level=4) {return 0.1};
if (audit level=4) {return 0.05}; and
if (audit level=5) {return 0.01}.

In an embodiment, the objects or records including the classified regulatory-related data (e.g., objects of the collected and classified regulatory-related data generated by the data classification module 136) are provided by the data classification module 126 as inputs to the risk compliance index score generator 128 for use in generating a risk compliance index score associated with the entity.

In an embodiment, the risk compliance index score is generated by the risk compliance index score generator 128 according to the following example expression:

$$\text{Overall risk compliance index score} = \frac{\sum_{1}^{n} w_n s_n}{\sum_{1}^{n} w_n}$$

where DSn is the Data source information for each data source (n), classified by Function type (Ft) and Control type (Ct); and this information is adjusted by the RCMM weight as available for each function and control type, and where Score 1 (S1)=DS1 (Ft, Ct)*RCMMweight(Ft,Ct) (where Score n (Sn) is generated for each source and each Ft and Ct as input), Score 2 (S2)=DS2 (Ft, Ct), Score 3 (S3)=DS3 (Ft, Ct), and (S(n))=DS(n) (Ft, Ct)*RCMMweight(Ft,Ct);

In an embodiment, the risk compliance index score generator 128 can dynamically assign a weight to each different kind of data source based at least in part on a business domain of the entity. For example, the weight for an FDA data source can be a higher value for will be higher for an entity in the pharmaceutical industry. In an embodiment, a user interface can be operatively coupled to the risk compliance index score generator 128 to enable the adjustment of the weights (e.g., by the user system 102 associated with the entity).

In an embodiment, a BLDS can include a collection of data obtained over a period of time (e.g., multiple years). In an embodiment, older data can be considered to be less relevant. Accordingly, while calculating the corresponding risk score, the age of the data can be taken into account a time based weight T(0):

S(n)=BLDS (n) (Ft, Ct)=T(0)×(number of occurrences/total occurrences for time period 0)+T(1)×(number of occurrences/total occurrences for time period 1) . . . /(T(0)+T(1)+T(n)).

In an embodiment, the risk compliance index score generator 128 can assign recommended initial weights for the base line data sources (BLDS). Example initial weights assigned to various BLDSs can include: FDA=high, an assigned weight of 70%; Judiciary Fines and Settlements=medium, an assigned weight of 10%; country, low, an assigned weight of 5%; internal audits, medium, an assigned weight of 15%, etc. In an embodiment, a user interface is provided to adjust settings for these factors for an entity. In an embodiment, the weighing factors can be adjusted as the risk compliance index score generator 128 accumulates additional data. In an embodiment, repeated findings over time or non-conformance issues can be used to increase the weight to the related functions and control types.

In an embodiment, the risk compliance index score generator 128 can generate a ratio (e.g., from 0 to 1, where 1 is a high risk) for each control type and function. This resultant ratio (from 0 to 1) can be generated and presented as a grade as follows:

| Ratio | Grade |
|---|---|
| 0 to .2 | Very Low |
| 0.2 to .4 | Low |
| 0.4 to .6 | Medium |
| 0.6 to .8 | High |
| 0.8 to 1 | Very High |

The above ratio can be converted to % probability of audit issues as follows:

| Ratio | Compliance Grade | Probability percentage of an audit finding |
|---|---|---|
| 0 to .2 | Very Low | 0% to 20% |
| 0.2 to .4 | Low | 20% to 40% |
| 0.4 to .6 | Medium | 40% to 60% |
| 0.6 to .8 | High | 60% to 80% |
| 0.8 to 1 | Very High | 80% to 100% |

In an embodiment, the risk compliance index score generator 128 can generate an overall risk compliance index score by averaging all the individual risk compliance index scores as calculated above.

In an embodiment, the compliance prediction module 131 is configured to generate more actions based on the risk compliance index scores to enable an entity prioritize compliance-related activities in view of the identified business risks. For example, a QA function can have a "Process" control type score of 0.95 and a score of 0.31 in an "Investigation" control type. The QA team now has the ability to prioritize the "Process" work ahead of "Investigation" as the risk related to "Process" is more than the "Investigation". In another example, a Facility function can have a score of 0.57 in a "Technology" control type for the same organization. For the above examples, the overall priority can ranked as follows: QA-Process, Facility-Technology and QA-Investigation for the entire organization based on their relative risk scores. In an embodiment, the entity can take actions based on the factors that contributed to the risk scores. In the example above, the QA process had a high risk score due to not having a training SOP in place and having training records that were not current. The system can identify a "Create training SOP" action and an "Update training records" action that can be executed to reduce the QA Process risk score. In an embodiment, the risk compliance index score generator 128 processes multiple data records (e.g., millions of data objects) processed by the machine learning component 124 to refine the recommendations (e.g., recommend actions) as data changes over time to generate an action plan including multiple prioritized or recommended actions.

In an embodiment, the regulatory compliance assessment system 120 monitors systems and processes of an entity and data from multiple data sources in real-time to refine their actions in view of potential or identified non-conformances. In an embodiment, information associated with the identified actions can be provided by the compliance prediction module 131 to the machine learning component 124 to enable refinement of the risk compliance index scores.

In an embodiment, the compliance prediction module 131 can generate reports or electronic output files for consumption by one or more users associated with the entity to enable entities to take actions based on the identified risk level. For example, a graphical report can be generated including color-coded representations of a risk level (e.g., red indicates a very high risk and green indicates a very low risk). In an embodiment, the regulatory compliance assessment system 120 calculates and visually represents the various risk levels by function (QA/Facility, etc.) and control type (Process, people, etc.). For example, the QA function can have a very high risk for people, technology and governance control types. However, in this example, it can be determined that the QA risk in the investigation control type is low. Accordingly, an action can be identified and communicated to enable the QA team to prioritize their actions to reduce their overall risk by working on very high risk area first.

In an embodiment, the regulatory compliance assessment system 120 monitors designated system folders and files for new quality-related documents. The data can be compared against pre-defined standards automatically to identify one or more non-conformances. In an embodiment, the data is stored in the risk and compliance data store 130 for further processing, as described herein. In an embodiment, the regulatory compliance assessment system 120 assists entities to increase their monitoring of compliance status without increasing their staff in order to proactively identify potential non-compliance and lower a total cost of compliance.

Figure 2:
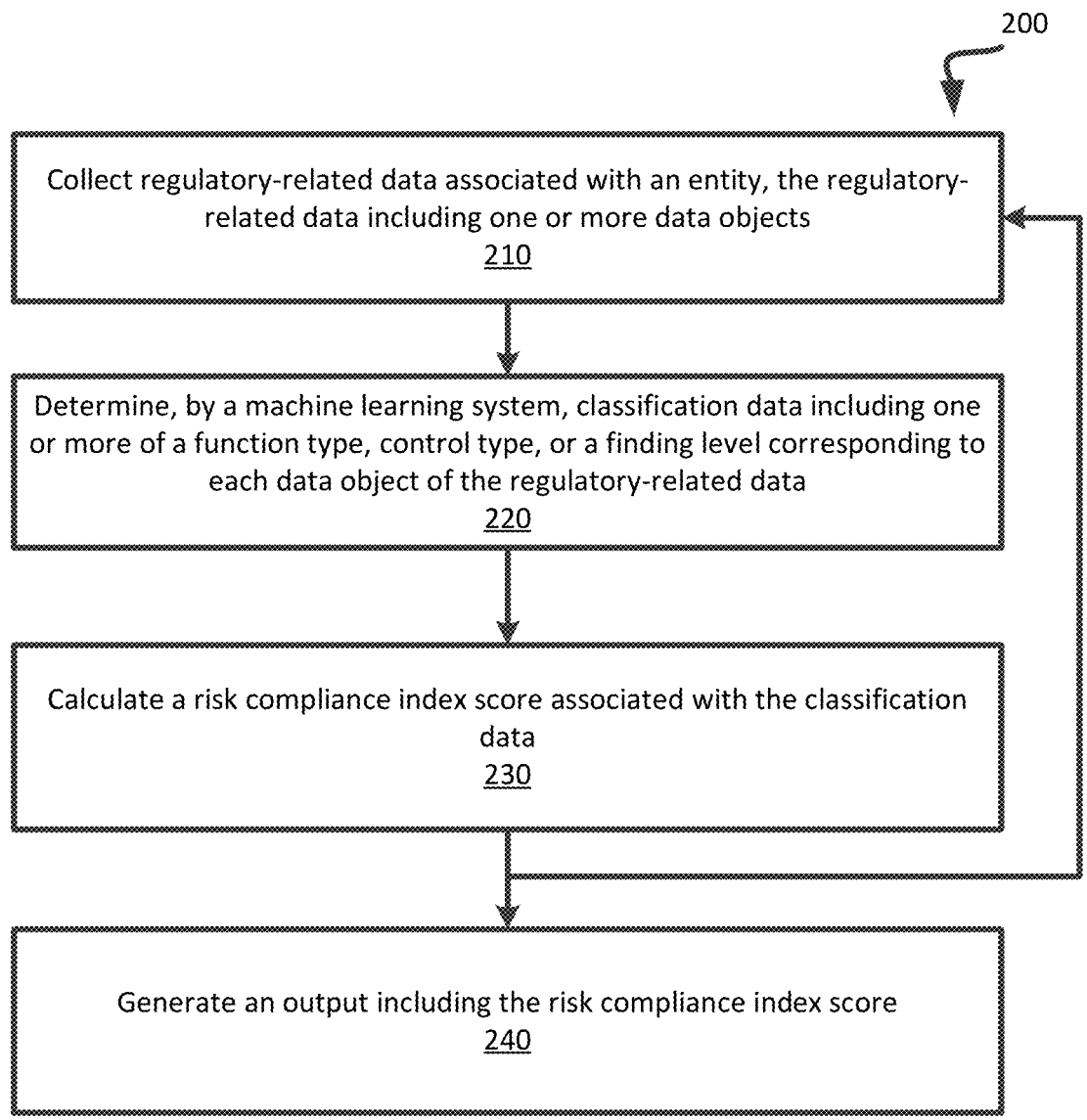
FIG. 2 is a flow diagram illustrating example embodiments of a regulatory compliance assessment process, in accordance with one or more embodiments of the present disclosure.

FIG. 2 depicts a flowchart illustrating example functionality implemented by a regulatory compliance assessment system (e.g., regulatory compliance assessment system 120 of FIG. 1) to collect and classify regulatory-related data obtained from one or more data source systems, according to embodiments of the present disclosure. It is understood that the flowchart of FIG. 2 provides an example of the many different types of functional arrangements that may be employed to implement the operation of the regulatory compliance assessment system 120 as described herein. The method 200 of FIG. 2 can be performed by processing logic that comprises hardware (e.g., circuitry, dedicated logic, programmable logic, microcode, etc.), software (e.g., instructions run on a processing device to perform hardware simulation), or a combination thereof. Method 200 may be performed in any order so as to fit the needs of the functionality to be provided. In this regard, the operations of method 200 can be performed simultaneously or in a different order than that depicted. In an embodiment, the operations of method 200 can be executed by the data monitoring and extraction module 122 of FIG. 1.

In operation 210, the processing logic collects, from multiple data sources, regulatory-related data associated with an entity. In an embodiment, the regulatory-related data can be in the form of one or more data objects (e.g., data files, documents, etc.) including multiple data elements (e.g., words, phrases, symbols, statistics, etc.). In an embodiment, the regulatory-related data (e.g., FDA raw data, fines and settlements data, internal and external audit data, country risk data, entity non-conformance data, etc.) is collected from one or more data source systems (e.g., the FDA.gov website). The regulatory-related data is processed for each data source system and can be monitored and searched for newly added items not yet collected and/or downloaded. In an embodiment, the raw data can be downloaded as full text or a file or other object and extract meta-data to identify the data item. In an embodiment, the processing logic programmatically reads the data for full text content and context queues to identify multiple data elements in the collected data.

In operation 220, the processing logic executes one or more machine learning systems or algorithms to determine classification data corresponding to each data object of the regulatory-related data. In an embodiment, the classification data includes one or more of a function type, a control type, or a finding level corresponding to the data object or a portion of the data object (e.g., one or more data elements of the data object). For example, for each data object or one or more data elements of the data object, the processing logic can determine one or more of a function type, a control type, or a finding level. In an embodiment, operation 220 can be executed iteratively to determine a function type, control type, and a finding level for each the multiple data elements of the data object.

In operation 230, the processing logic calculates a risk compliance index score associated with the classification data. In an embodiment, the risk compliance index score represents or defining a maturity level of the entity with respect to compliance as a function of one or more of the function type, control type, or findings level and/or predict risks associated with the function type, control type, or findings level. In an embodiment, individual risk compliance index scores can be determined for each data source as a function of the classification data (e.g., function type, control type, and findings level) and a final or overall risk compliance index score associated with the entity can be calculated based on the individual risk compliance index scores.

In operation 240, the processing logic can generate an output (e.g., a report or graphical user interface to be provided to a user system associated with the entity) including the risk compliance index score for provisioning to a user system associated with the entity. In an embodiment, the report can include multiple individual risk compliance index scores and/or an overall risk compliance index score for the entity. In an embodiment, the report can include predicted risk compliance scores based on adjusting, modifying, updating, or changing one or more compliance-related factors to determine the impact or change to the corresponding risk compliance score. In an embodiment, the report can include one or more recommended actions that the entity can execute to increase or improve the individual risk compliance index score and/or the overall risk compliance index score. As shown in FIG. 2, operations of the method 200 can be performed iteratively, such that operations 210-230 can be repeated to generate one or more new or updated risk compliance scores to be output in operation 240. In an embodiment, the processing device is configured to continuously and/or iteratively monitor the multiple data sources to identify new or updated regulatory-data, in a subsequent iteration of operation 210. In an embodiment, the updated regulatory-related data that is collected can be used to determine updated classification data and used to calculate an updated risk compliance index score based on the updated classification data.

Figure 3:
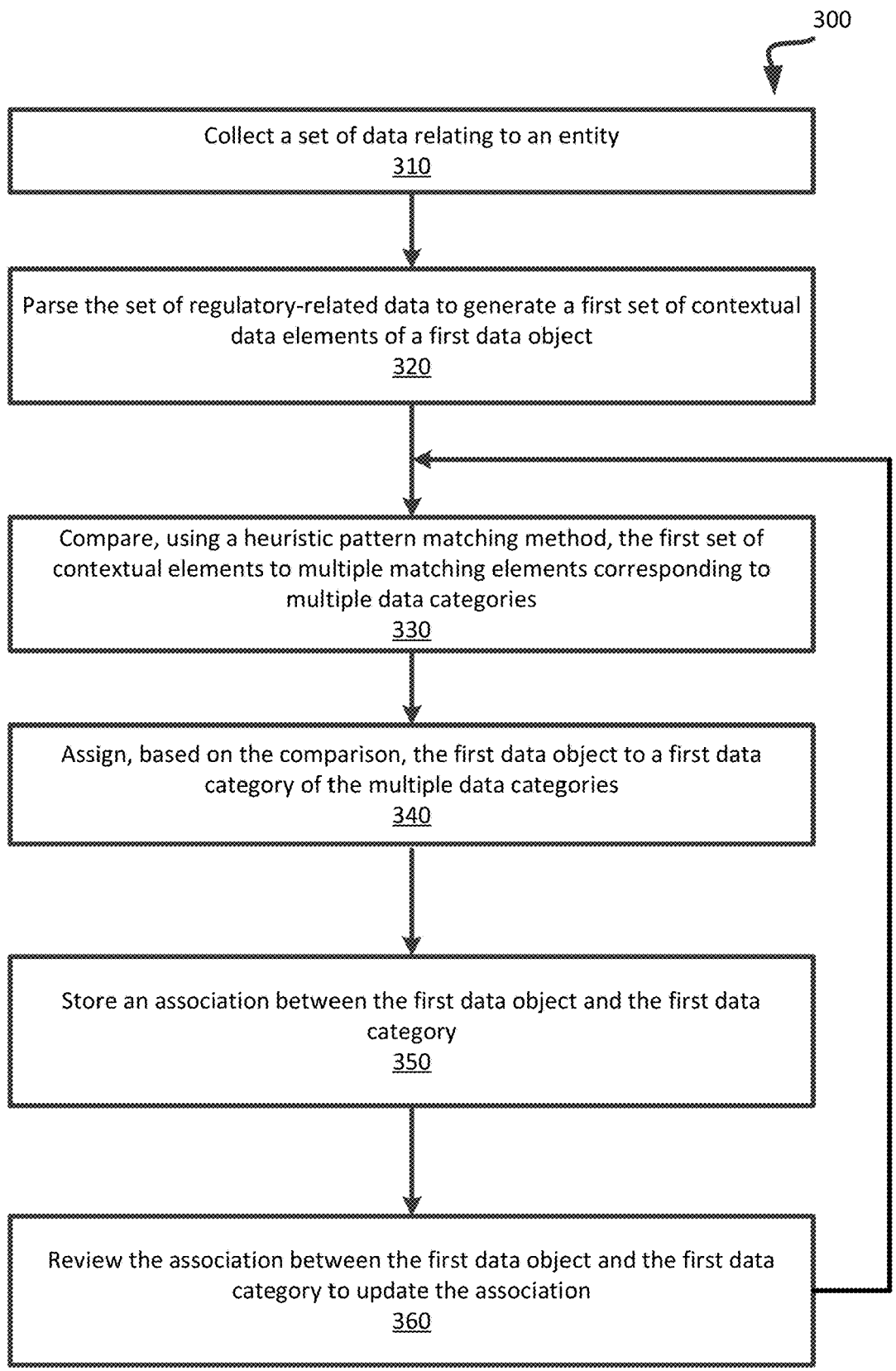
FIG. 3 is a flow diagram illustrating example embodiments of a regulatory compliance assessment process, in accordance with one or more embodiments of the present disclosure.

FIG. 3 depicts a flowchart illustrating example functionality implemented by a regulatory compliance assessment system (e.g., regulatory compliance assessment system 120 of FIG. 1) to collect and classify regulatory-related data obtained from one or more data source systems, according to embodiments of the present disclosure. It is understood that the flowchart of FIG. 3 provides an example of the many different types of functional arrangements that may be employed to implement the operation of the regulatory compliance assessment system 120 as described herein. The method 300 of FIG. 3 can be performed by processing logic that comprises hardware (e.g., circuitry, dedicated logic, programmable logic, microcode, etc.), software (e.g., instructions run on a processing device to perform hardware simulation), or a combination thereof. Method 300 may be performed in any order so as to fit the needs of the functionality to be provided. In this regard, the operations of method 300 can be performed simultaneously or in a different order than that depicted. In an embodiment, the processing logic executes one or more heuristic pattern matching techniques to perform the operations relating to classification of the data. In an embodiment, the operations of method 300 can be executed by the data classification module 126 of FIG. 1.

In operation 310, the processing logic collects a set of regulatory-related data associated with an entity, wherein the entity is subject to one of more regulatory requirements, rules, constraints, considerations, processes, etc. In an embodiment, the processing logic programmatically reads the regulatory-related data as it is added to a data store (e.g., the risk and compliance data store 130 of FIG. 1).

In operation 320, the processing logic parses the set of data to generate a first set of contextual data elements of a first data object of the collected regulatory-related data. In an embodiment, the processing logic parses the text of the first data object into "meaningful" or "contextual" data elements (e.g., words or phrases) that can be used to provide context to the data object and discards data elements considered as non-contextual language. In an embodiment, the set of contextual (e.g., meaningful) data elements can be identified by comparing the multiple data elements with a set of predetermined or previously identified contextual data elements (e.g., keywords, phrases, symbols, etc.).

In operation 330, the processing logic compares, using a heuristic pattern matching method, the first set of contextual elements to multiple matching elements corresponding to multiple data categories. In an embodiment, the processing logic identifies matching meaningful phrases from categorizations previously marked as approved (i.e., one or more previous categorizations were evaluated by experienced personnel and deemed to have correctly classified the elements and have been recorded as such). An example of heuristic pattern matching is to create a lookup set of phrases based upon regular expression (RegEx) wildcard pattern syntax found in a random set of data elements and then link them to the functional area and control type classifications approved for those data elements. These lookup tables are then used to classify new data elements with matching expression phrases to the same functional areas and control types as from the lookup table system.

In operation 340, the processing logic assign, based on the comparison, the first data object to a first data category of the multiple data categories. In operation 350, the processing logic stores an association between the first data object and the first data category. In an embodiment, the processing logic stores the categorization as metadata along with each data item analyzed.

In operation 360, the processing logic reviews the association between the first data object and the first data category to update the association (e.g., change the association to identify a new or second data category for the first data object). In an embodiment, the processing logic can periodically review, or provide an output to a user for review (e.g., via a graphical user interface), a subset of data or new or updated regulatory-related data to update the categorization (e.g., the association) and/or mark the categorized data item as approved. As shown in FIG. 3, operations of the method 300 can be performed iteratively, such that following operation 350, the output can be used as a seed set upon which the categorization in operation 330 can identify approved data to increase an accuracy of the classification operation.

Figure 4:
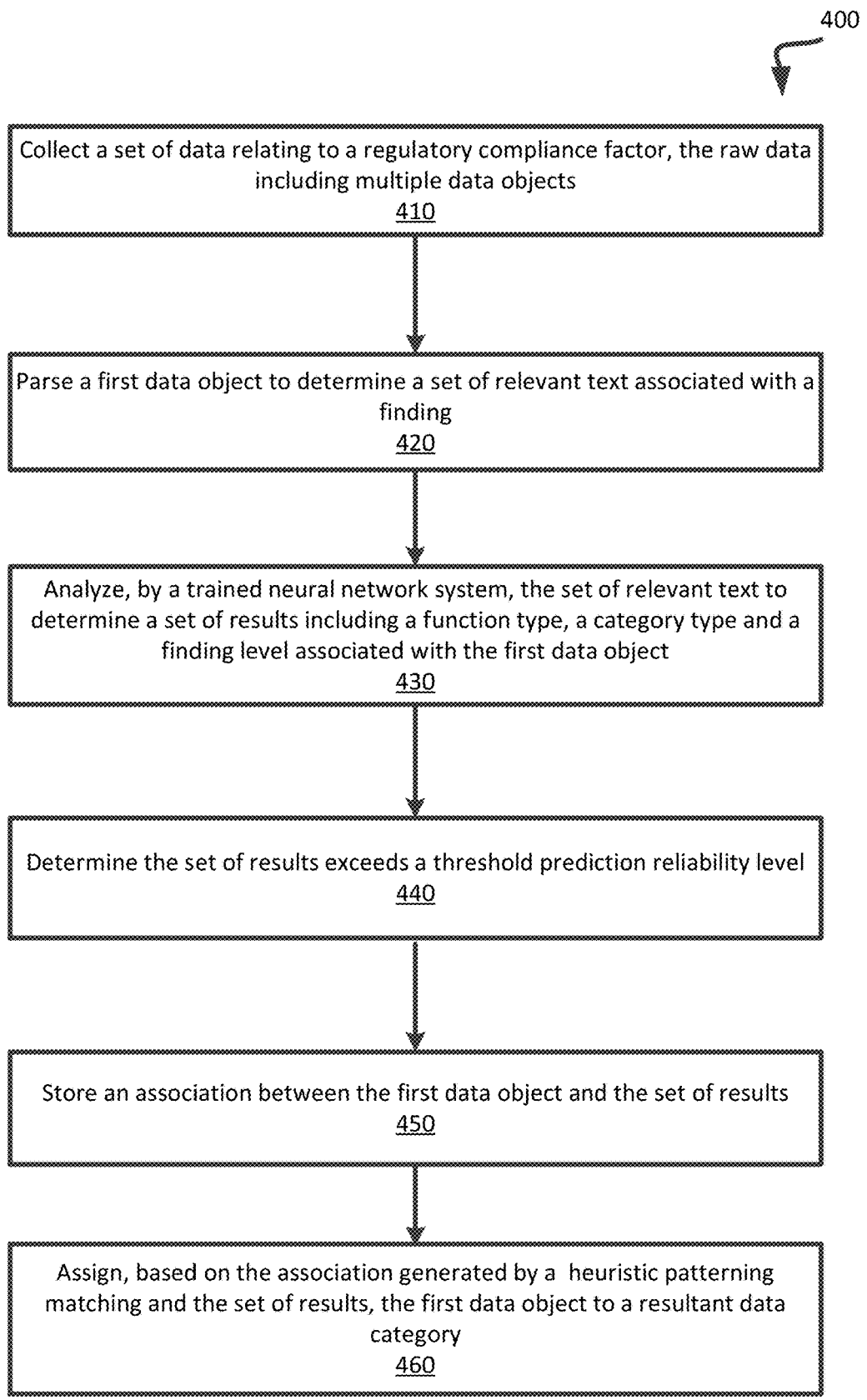
FIG. 4 is a flow diagram illustrating example embodiments of a regulatory compliance assessment process, in accordance with one or more embodiments of the present disclosure.

FIG. 4 depicts a flowchart illustrating example functionality implemented by a regulatory compliance assessment system (e.g., regulatory compliance assessment system 120 of FIG. 1) to classify regulatory-related data obtained from one or more data source systems, according to embodiments of the present disclosure. It is understood that the flowchart of FIG. 4 provides an example of the many different types of functional arrangements that may be employed to implement the operation of the regulatory compliance assessment system 120 as described herein.

The method 400 of FIG. 4 can be performed by processing logic that comprises hardware (e.g., circuitry, dedicated logic, programmable logic, microcode, etc.), software (e.g., instructions run on a processing device to perform hardware simulation), or a combination thereof. Method 400 may be performed in any order so as to fit the needs of the functionality to be provided. In this regard, the operations of method 400 can be performed simultaneously or in a different order than that depicted. In an embodiment, the processing logic executes one or more multi-dimensional neural network processing to perform the operations relating to classification of the data. In an embodiment, the operations of method 400 can be executed by the data classification module 126 of FIG. 1. In an embodiment, method 400 can be executed by a multi-dimensional neural network together with the method 300 executed by the heuristic pattern matching system, wherein both method 300 and method 400 are executed and their respective outputs or results are combined to determine a resultant categorization for each data element (e.g., operation 460 set forth below). In an embodiment, the respective outputs of the heuristic pattern matching and the neural network are combined using an algorithm taking into account the confidence level of classifications returned by the neural network classification (here the heuristic pattern matching classification is denoted as $C_{HP}$ and the neural network classification is denoted as $C_{NN}$):

| Comparison result of Heuristic pattern matching classification | Resultant classification |
|---|---|
| $C_{HP} = C_{NN}$ | $C_{HP}$ |
| $C_{HP} \neq C_{NN}$ and $C_{NN}$ confidence >= 80% | $C_{NN}$ |
| $C_{HP} \neq C_{NN}$ and $C_{NN}$ confidence < 80% | $C_{HP}$ |

In an embodiment, the multi-dimensional neural network can be trained to enable classification of the regulatory-related data. In an embodiment, the neural network is configured to reads each document (e.g., a document received from a BLDS) that has approved function types. The approved and classified function types or areas are identified as a "correct output" to be trained in the network. In an embodiment, the neural network of the data classification module (e.g., data classification module 126 of the machine learning component 124 of FIG. 1) parses each document object to determine an entirety of the relevant text of the finding and establishes the text as a set of "input signals". In an embodiment, the "input signals" and "correct output" are fed as training information into the neural network. In an embodiment, the resultant state of the neural network is saved for the machine learning classification processing, as described in method 400. In an embodiment, the training steps described above can be repeated for multiple control types and findings levels for data received from one or more of the BLDSs.

In operation 410, the processing logic of a trained neural network collects a set of raw data relating to a regulatory compliance factor, the raw data includes multiple data objects. In an embodiment, the processing logic programmatically reads the raw data (e.g., FDA data and fines and settlements data) added to the risk and compliance data store 130. In an embodiment, the processing logic programmatically reads the regulatory-related data as it is added to a data store (e.g., the risk and compliance data store 130 of FIG. 1).

In operation 420, the processing logic parses a first data object of the multiple data objects to determine a set of relevant text associated with a finding. In an embodiment, "relevant text" means the text remaining after page formatting text elements such as document tags that encode sizing and font instructions and page headers and footers are removed. In an embodiment, each of the multiple data objects that are collected are parses and processed, according to method 400. In an embodiment, determines a function, a category and a finding level associated with a first data object of the multiple data objects.

In operation 430, the processing logic analyzes, using a trained neural network, the set of relevant text to determine a set of results including a function type, a category type, and a finding level associated with the first data object. In an embodiment, the set of relevant text of each collected data object is fed through the trained neural network to determine an output including the function type, the category type and the finding level as a set of weighted percentages. In an embodiment, the set of weighted percentages can be used in calculating the risk compliance index score associated with the data object.

In operation 440, the processing logic determines whether the set of results exceeds a threshold prediction reliability level. In an embodiment, the threshold prediction reliability level is a value that is predetermined or calculated to represent a threshold level of reliability to compare the output of operation 430 to determine if it satisfies a standard of reliability to confirm the results.

In operation 450, in response to determining the threshold prediction reliability level is exceeded, the processing logic stores an association between the first data item and the set of results. In an embodiment, storing the confirmed set of results represent an assignment of the data object to the identified category type. In an embodiment, the set of results are stored as metadata in association with the data object. In an embodiment, on a periodic basis, the trained neural network can be retrained using the approved data received from the heuristic pattern matching analysis (e.g., the output of method 300) as the input training set for the neural network.

In operation 460, the association identified by the heuristic pattern matching process of method 300 can be combined with the neural network-based method 400 to assign a resultant (e.g., updated or verified) data category to the first data object. In an embodiment, outputs of the method 300 executed by the heuristic pattern matching system and method 400 executed by a neural network system can be combined to determine a resultant categorization for each data object of the regulatory-related data.

Figure 5:
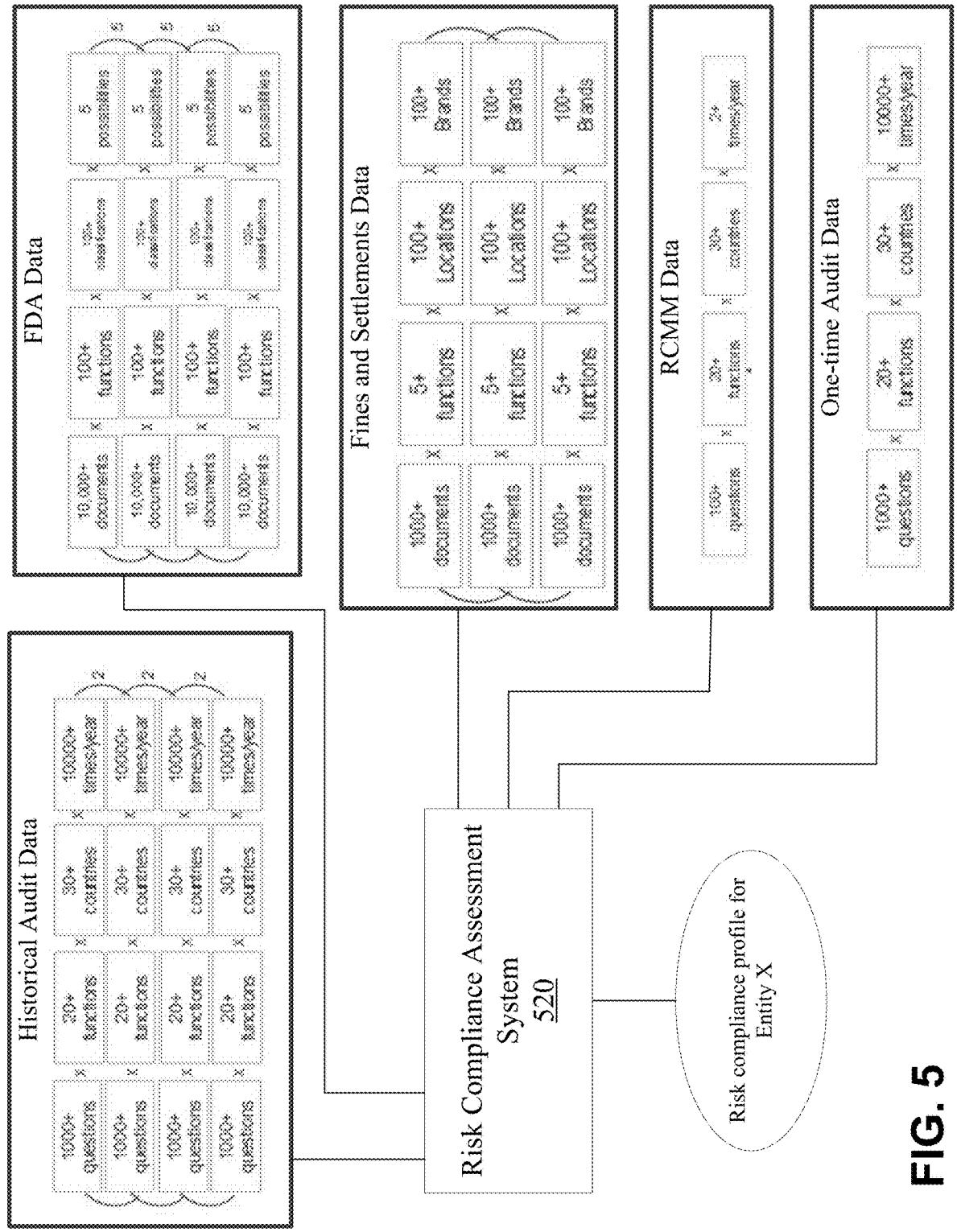
FIG. 5 illustrates an example regulatory compliance assessment system in an example computing environment including multiple data sources, in accordance with one or more embodiments of the present disclosure.

FIG. 5 depicts an example environment including a regulatory compliance assessment system 520 operatively coupled to multiple different data source systems to collect raw regulatory-related data associated with an entity (e.g., Entity X). In the example illustrated in FIG. 5, the regulatory compliance assessment system 520 is configured to collect the raw regulatory elated data from one or more sources providing historical audit data, FDA data, fines and settlements data, RCMM data, and audit data and analyze the raw data to generate multiple multi-dimensional data sets that are classified and used to generate a risk compliance profile including a risk compliance index score for the entity.

In an embodiment, the regulatory compliance assessment system 520 enables a cyclic process data ingestion from internal and real-world data from external sources using a data monitoring and extraction component and a machine learning component to generate and update a risk compliance index score associated with an entity. In an embodiment, the regulatory compliance assessment system 520 generates a risk compliance index applied to various levels within an entity to measure the maturity level. In an embodiment, the regulatory compliance assessment system 520 generates a maturity map by function, by location, by roles, and other data dimensions that can be added and aggregated at the entity level (e.g., a final or overall risk compliance index score for the entity). The risk compliance index score or scores for the entity enable the entity to identify entity-specific compliance-related business risks and prioritize compliance actions to address high-risk areas with a higher or highest priority. The RCMI framework works as a decision-support system.

In an embodiment, as shown in FIG. 5, the risk compliance profile including the corresponding risk compliance index score is generated by collecting, processing, automating data and information from various data sources and applying continuous learning models to refine scores over a period of time.

In an embodiment, the historical audit data can be analyzed by the regulatory compliance assessment system 520 to generate a factor for use in determining a risk compliance index score for the entity based on multiple question sets (e.g., sets or questionnaires including 1,000 or more questions), multiple different function types (e.g., 20 or more function types) and multiple different countries (e.g., 30 or more countries) determined and collected in accordance with a collection frequency (e.g., 10,000 or more times per year). In an embodiment, the historical audit data can be stored for many years.

In an embodiment, the FDA data can be analyzed by the regulatory compliance assessment system 520 to generate a factor for use in determining a risk compliance index score for the entity based on multiple document data object) sets (e.g., 10,000 or more documents), multiple different function types (e.g., 100 or more function types), multiple different category or classification types (e.g., 100 or more classifications) in view of multiple different countries and possibilities associated with the FDA findings (e.g., 5 different possibilities such as "not available", "not written", etc.)

In an embodiment, the fines and settlements data can be analyzed by the regulatory compliance assessment system 520 to generate a factor for us in determining a risk compliance index score for the entity based on multiple document (or data object) sets (e.g., 1,000 or more documents), multiple different function types (e.g., 5 or more function types), multiple different geographic locations (e.g., 100 or more locations), and multiple brands associated with the entity (e.g., 100 or more brands).

In an embodiment, the RCMM data can be analyzed by the regulatory compliance assessment system 520 to generate a factor for us in determining a risk compliance index score for the entity based on multiple question sets (e.g., sets or questionnaires including 100 or more questions), multiple different function types (e.g., 20 or more function types), multiple different countries (e.g., 30 or more countries), and a collection and analysis frequency (e.g., 2 or more times per year). This is described as Risk & Compliance Maturity Model (RCMM). In an embodiment, the risk assessment compliance system executes assessments of a business function by using a RCMM questionnaire in a process that is repeated over time to maintain a current state of maturity. As shown in the example of FIG. 5, the RCMM model has over 100 questions, executed over 20+ business functions within an entity for multiple companies operated by the entity, wherein the processing is repeated several times every year.

In an embodiment, the one-time audit data (e.g., an audit relating to the current year) can be analyzed by the regulatory compliance assessment system 520 generate a factor for us in determining a risk compliance index score for the entity based on multiple question sets (e.g., sets or questionnaires including 1,000 or more questions) multiple different function types (e.g., 20 or more function types), multiple different countries (e.g., 30 or more countries), and a collection and analysis frequency (e.g., 10,000 or more times per year). In an embodiment, the current year audit data can be used to predict business risks (e.g., time-sensitive or immediate risks).

As described in detail above in accordance with FIGS. 1-4, the regulatory compliance assessment system 520 generates a risk compliance profile for the entity based on the aforementioned data. In an embodiment, the risk compliance profile includes a risk compliance index score and one or more predictions or actions associated with the risk compliance index score. In an embodiment, the predictions or actions can include a plan having a prioritized listing of actions that are recommended for the entity in order to increase the calculated risk compliance index score.

In an embodiment, one or more risk compliance index predictions can be generated based on one or more of the FDA 483 data, citation information, internal audit data, fines and settlements data, and country risks data. In an embodiment, for example, the regulatory compliance assessment system 520 processes the FDA 483 from 10,000 or more documents, 100 or more functions, over 100 classifications to map data, and 5 or more possibilities for each data point to generate a prediction. In an example, the regulatory compliance assessment system 520 can process a large quantity of historical data (e.g., over 10 years of data) that can be used to make the prediction. In an embodiment, the regulatory compliance assessment system 520 can use fines and settlements data in the prediction model, wherein, for example, the system processes 1,000 or more documents, 5 or more functions, 100 or more locations, and 100 or more brands for an entity to generate one or more prediction decisions.

In an embodiment, the regulatory compliance assessment system 520 processes multiple records (e.g., millions of records) to prioritize actions to be taken by the entity to increase or improve an associated risk compliance index score. In an embodiment, one or more machine learning algorithms executed by the machine learning component of the regulatory compliance assessment system 520 to refine the recommendations as data changes over time. The risk compliance profile including the one or more risk compliance index scores and corresponding prioritized actions can enable an entity to take actions based on their identified business risks. Advantageously, the regulatory compliance assessment system 520 iteratively and repeatedly monitors an entity's systems and information in real-time to identify the recommended actions to be executed by an entity (e.g., identify potential non-conformances and associated actions to assist the entity in establishing conformity) and iteratively refine or update the corresponding risk compliance index score for the entity.

In an embodiment, the regulatory compliance assessment system 520 generates one or more reports configured to present information to a user system associated with an entity. An example report or risk compliance profile 600 is shown in FIG. 6. As shown, the example report (e.g., the Predictive Compliance Sample Report) includes multiple risk levels (e.g., corresponding to a determined risk compliance index score) for various function types (e.g., QA, document control, facility, materials) and control types (process, people, quality, technology, governance, investigation, improvement, third party). For example, as shown in the example report, the QA function has a very high risk for the people, technology and governance control types. However, the risk associated with the QA function in the investigation control type is low. In an example, in view of the report, the QA team of the entity can prioritize their actions to reduce their overall risk by working on very high risk area first. In an embodiment, the various risk levels (e.g., very low, low, medium, high, and very high) can have a corresponding color (e.g., a very high risk level can be color-coded with red; a very low risk level can be color-coded with blue, etc.) to graphically indicate the associated risk level and risk compliance index score (e.g., 0.27, 0.18, 0.43, 0.79, 0.95, etc.). Advantageously, the risk compliance profile/report can be displayed to a user system via a graphical user interface.

In an embodiment, the regulatory compliance assessment system 520 is configured to monitor designated system folders and files for new or updated regulatory-related data (e.g., quality-related documents). The updated data can be compared against pre-defined standards to identify non-conformances. In addition, the updated data can be stored for further processing to enable an entity to increase and improve monitoring of their compliance status, without having to increase their staff in order to lower the total cost of compliance.

Figure 7:
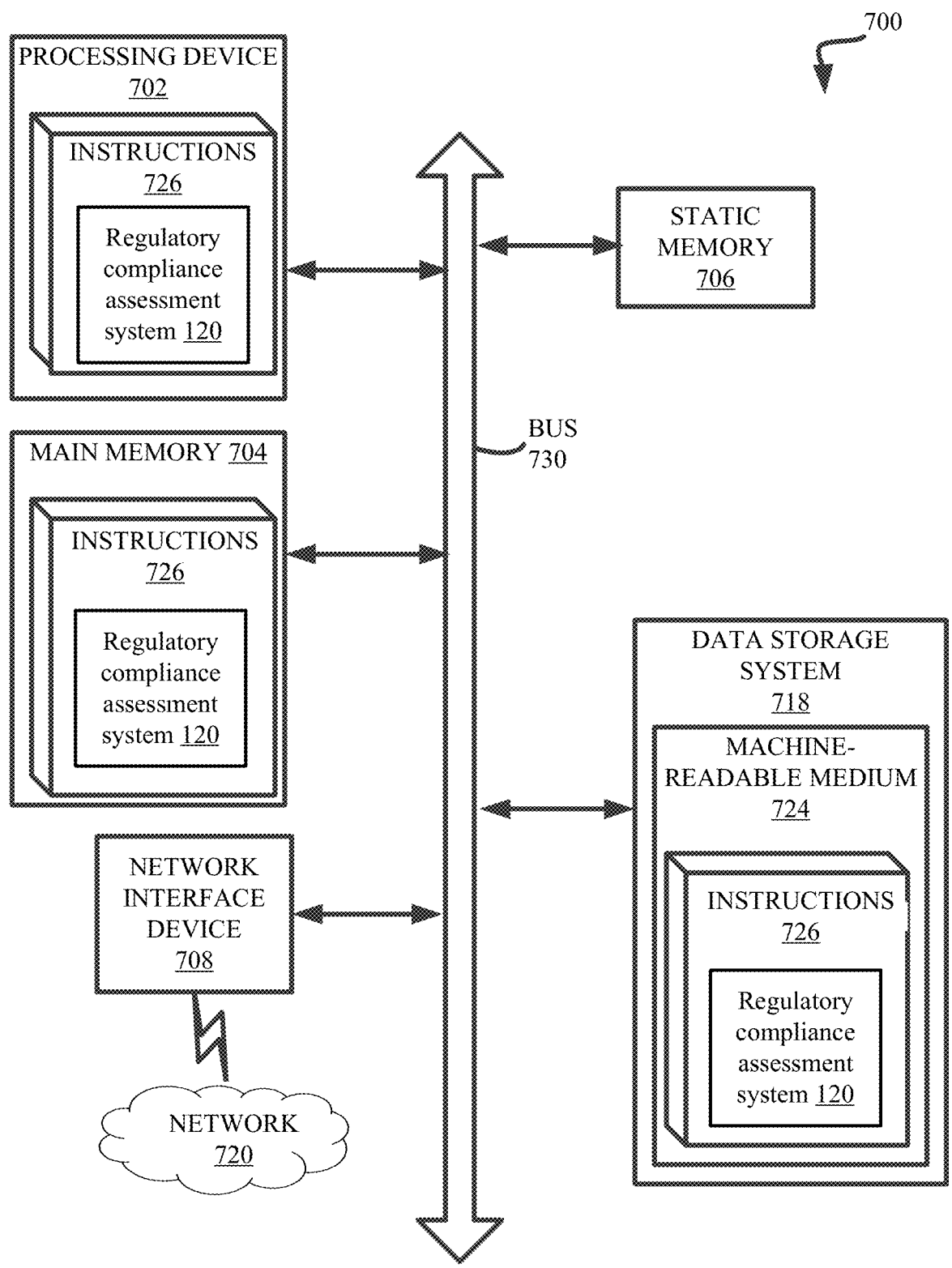
FIG. 7 is a schematic block diagram that provides an example illustration of a computing environment executing instructions relating to a regulatory compliance assessment system, in accordance with one or more embodiments of the present disclosure.

FIG. 7 illustrates a diagrammatic representation of a machine in the example form of a computer system 700 including a set of instructions executable by a regulatory compliance assessment system (e.g., regulatory compliance assessment system 120 of FIG. 1) to cause the system to perform any one or more of the methodologies discussed herein. In one embodiment, the regulatory compliance assessment system 120 can include instructions to enable execution of the processes and corresponding components shown and described in connection with FIGS. 1-6.

In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein The example computer system 700 includes a processing device (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. In various implementations of the present disclosure, the processing device 702 is configured to execute instructions for the regulatory compliance assessment system 120 for performing the operations and processes described herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-readable medium 728 on which is stored one or more sets of instructions of the regulatory compliance assessment system 120 embodying any one or more of the methodologies or functions described herein. The instructions may also reside, completely or at least partially, within the main memory 704 and/or within processing logic 726 of the processing device 702 during execution thereof by the computer system 700, the main memory 704 and the processing device 702 also constituting computer-readable media.

The instructions may further be transmitted or received over a network 720 via the network interface device 708. While the computer-readable storage medium 728 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "collecting", "determining", "calculating", "generating", "assigning", "storing", "parsing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    collecting, by a processing device, regulatory-related data associated with an entity, wherein the regulatory-related data comprises a plurality of data objects;
    determining, by a neural network executed by the processing device, a first set of classification designations corresponding to the plurality of data objects, wherein the neural network generates each of the first set of classification designations based on a combination of function type data corresponding to each of the plurality of data objects, control type data corresponding to each of the plurality of data objects, and findings level data corresponding to each of the plurality of data objects, wherein the neural network is trained based on training data set comprising parsed text of a set of documents having an approved function type to enable the determining of the first set of classification designations;
    determining a confidence level associated with a first classification designation of the first set of classification designations;
    determining, by a heuristic pattern matching system executed by the processing device, a second set of classification designations corresponding to the plurality of data objects, wherein the heuristic pattern matching system generates each of the second set of classification designations based on a combination of function type data corresponding to each of the plurality of data objects, control type data corresponding to each of the plurality of data objects, and findings level data corresponding to each of the plurality of data objects;
    assigning a resultant classification designation to a first data object of the plurality of data objects, wherein the resultant classification designation is determined based on a comparison of the first classification designation, a second classification designation of the second set of classification designations, and the confidence level;
    calculating a risk compliance index score associated with the resultant classification designation, wherein the risk compliance index score comprises a compliance level of a set of compliance levels;
    generating, based on the risk compliance index score, a recommended action corresponding to compliance by the entity with regulatory guidelines; and
    generating a graphical user interface comprising a display of the risk compliance index score and the recommended action.

2. The method of claim 1, further comprising:
    iteratively collecting updated regulatory-related data associated with the entity;
    determining, by the neural network and the heuristic pattern matching system, updated resultant classification designations; and
    calculating an updated risk compliance index score associated with the updated resultant classification designations.

3. The method of claim 1, wherein the regulatory-related data is collected from a plurality of different data sources.

4. A system comprising:
    a processing device; and
    a memory to store computer-executable instructions that, if executed, cause the processing device to perform operations comprising:
        collecting, by a processing device, regulatory-related data associated with an entity, wherein the regulatory-related data comprises a plurality of data objects;
        determining, by a neural network executed by the processing device, a first set of classification designations corresponding to the plurality of data objects, wherein the neural network generates each of the first set of classification designations based on a combination of: function type data corresponding to each of the plurality of data objects, control type data corresponding to each of the plurality of data objects, and findings level data corresponding to each of the plurality of data objects, wherein the neural network is trained based on training data comprising parsed text of a set of documents having an approved function type to enable the determining of the first set of classification designations;
        determining a confidence level associated with a first classification designation of the first set of classification designations;

determining, by a heuristic pattern matching system executed by the processing device, a second set of classification designations corresponding to the plurality of data objects, wherein the heuristic pattern matching system generates each of the second set of classification designations based on a combination of function type data corresponding to each of the plurality of data objects, control type data corresponding to each of the plurality of data objects, and findings level data corresponding to each of the plurality of data objects;

assigning a resultant classification designation to a first data object of the plurality of data objects, wherein the resultant classification designation is determined based on a comparison of the first classification designation, a second classification designation of the second set of classification designations, and the confidence level;

calculating a risk compliance index score associated with the resultant classification designation, wherein the risk compliance index score comprises a compliance level of a set of compliance levels;

generating, based on the risk compliance index score, a recommended action corresponding to compliance by the entity with regulatory guidelines; and generating a graphical user interface comprising a display of the risk compliance index score and the recommended action.

5. The system of claim 4, wherein the operations further comprise:
reviewing an association between the first data object and the resultant classification designation to update the association.

6. The system of claim 4, wherein the operations further comprise:
parsing the first data object of the plurality of data objects to determine a set of relevant text associated with first findings level data.

7. The system of claim 4, wherein the operations further comprise:
determining a first classification designation associated with the first data object exceeds a threshold prediction reliability level.

8. The system of claim 7, wherein the operations further comprise:
assigning the first data object to the first classification designation.

9. A non-transitory computer-readable storage device storing computer-executable instructions that, if executed by a processing device, cause the processing device to perform operations comprising:
collecting regulatory-related data associated with an entity, wherein the regulatory-related data comprises a plurality of data objects;
determining, by a neural network executed by the processing device, a first set of classification designations corresponding to the plurality of data objects, wherein the neural network generates each of the first set of classification designations based on a combination of: function type data corresponding to each of the plurality of data objects, control type data corresponding to each of the plurality of data objects, and findings level data corresponding to each of the plurality of data objects, wherein the neural network is trained based on training data comprising parsed text of a set of documents having an approved function type to enable the determining of the first set of classification designations;

determining a confidence level associated with a first classification designation of the first set of classification designations;

determining, by a heuristic pattern matching system executed by the processing device, a second set of classification designations corresponding to the plurality of data objects, wherein the heuristic pattern matching system generates each of the second set of classification designations based on a combination of function type data corresponding to each of the plurality of data objects, control type data corresponding to each of the plurality of data objects, and findings level data corresponding to each of the plurality of data objects;

assigning a resultant classification designation to a first data object of the plurality of data objects, wherein the resultant classification designation is determined based on a comparison of the first classification designation, a second classification designation of the second set of classification designations, and the confidence level;

calculating a risk compliance index score associated with the resultant classification designation, wherein the risk compliance index score comprises a compliance level of a set of compliance levels;

generating, based on the risk compliance index score, a recommended action corresponding to compliance by the entity with regulatory guidelines; and generating a graphical user interface comprising a display of the risk compliance index score and the recommended action.

10. The non-transitory computer-readable storage device of claim 9, the operations further comprising reviewing an association between the first data object and the resultant classification designation to update the association.

11. The non-transitory computer-readable storage device of claim 9, the operations further comprising:
determining a first classification designation associated with the first data object exceeds a threshold prediction reliability level; and
assigning the first data object to the first classification designation.

12. The non-transitory computer-readable storage device of claim 9, the operations further comprising:
calculating a plurality of risk compliance index scores each corresponding to a data object of the plurality of data objects, wherein the plurality of risk compliance index scores comprises a first risk compliance index score associated with the first data object based at least in part on a first resultant classification designation of the first data object; and
determining an overall risk compliance index score associated with the entity based on the plurality of risk compliance index scores corresponding to the plurality of data objects.

* * * * *